Nov. 19, 1940.  L. EDELMANN  2,221,913
HYDROMETER FLOAT
Filed Dec. 2, 1937
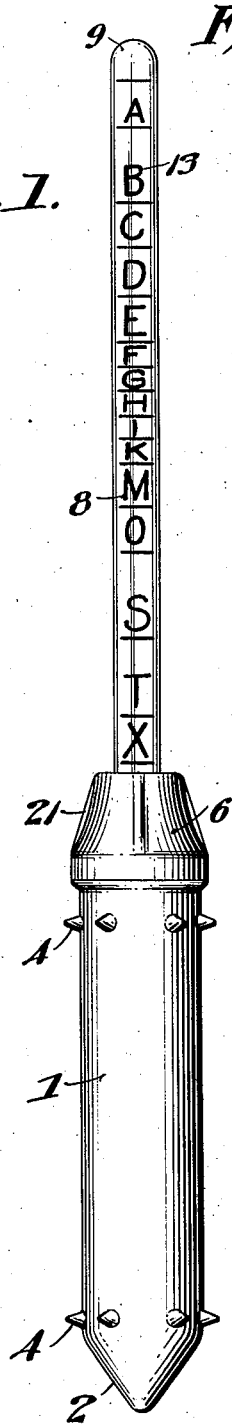
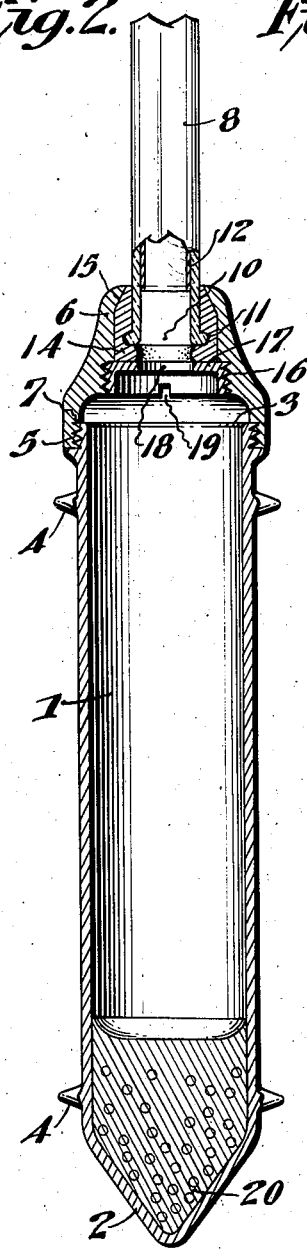
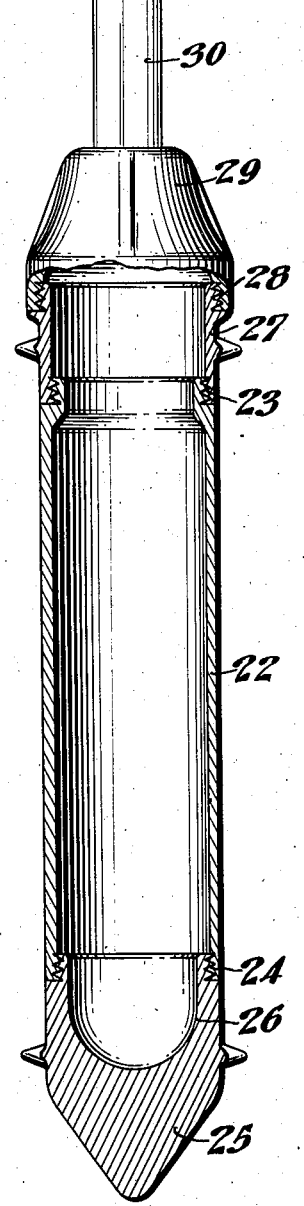
Inventor
Leo Edelmann
By Lloyd W. Patch
Attorney Patented Nov. 19, 1940

2,221,913

UNITED STATES PATENT OFFICE 2,221,913

HYDROMETER FLOAT

Leo Edelmann, Chicago, Ill.

Application December 2, 1937, Serial No. 177,811

3 Claims. (Cl. 265—45)

My present invention relates to improvements in hydrometer floats, and pertains particularly to a float adapted for use in a syringe hydrometer, and in other adaptations, in connection with an instrument or structure intended to be used in testing and determining the specific gravity of battery liquids, radiator solutions, and other liquid solutions.

The primary object of my invention is to provide a float portion or element which can be fitted to and used with substantially any and all types and constructions of specific gravity instruments and like testing apparatus, in the place of the ordinary glass floats as now usually employed, and which will prove more durable, satisfactory and lasting in use.

Another object is to provide an instrument or element of this character which can be readily made up and assembled and prepared for use without requiring the services of specially skilled mechanics or artisans, and which will thus be capable of production at relatively lower costs than the ordinary glass hydrometer float elements.

A further object is to so construct the float element that it can be readily adapted for manufacture and calibration for different characters of liquid and different strengths of solutions, and that each individual float element can be accurately made to give close readings, without the necessity of figuring corrections when tests are made at the temperature at which the float is calibrated, and which will permit close and accurate readings to thus avoid errors in calibration, when variations in the temperature of the solution being tested are taken into account and corrections for temperature are to be made.

Yet another object and purpose is to so construct the hydrometer float element that the main parts thereof can be manufactured and molded by machine, to thus reduce hand operations and obtain maximum accuracy, and with which the assembling operations can be carried out simply and quickly, and without requiring the services of specially skilled artisans or persons.

With the above and other objects in view, which will be apparent to those skilled in the art and to those perusing this specification, my invention includes certain novel features of construction and combinations and arrangements and association of parts, which will be hereinafter set forth in connection with the drawing and then pointed out in the claims.

In the drawing:

Figure 1 is a view in side elevation showing a hydrometer float element constructed in accordance with my invention.

Fig. 2 is a fragmentary view of the float bulb end showing the same in longitudinal section.

Fig. 3 is a view similar to Fig 2 illustrating a modified construction.

The float bulb portion 1 can be molded, or shaped or formed from a synthetic resinous compound, from Celluloid, or from any other suitable material which is not readily frangible and which will be resistant to and not readily affected by solutions of the character to be tested. I have found that the float bulb portion is readily formed by molding the material under high pressure, and a perfectly formed and shaped bulb portion is thus made, the material throughout being of a substantially uniform degree of density and consistency, and the parts being more accurately made and sized than has heretofore been commercially possible. The float bulb portion 1 is preferably made up to be of substantially cylindrical tubular form, and is preferably closed at the lower end 2 and open at the upper end 3. This lower end 2 can be shaped or molded to have any external shape and form and contour that may be desired, and the body portion may have the spacing points or projections 4 thereon adjacent to either the upper or lower ends, or both, or these may be omitted as conditions and the particular use may require.

At its upper end this body or bulb portion 1 is provided with screw threads, as at 5, and a connecting sleeve 6 is provided with mating threads 7 so that the connecting sleeve 6 can be mounted at the open end 3 of the bulb or body portion.

A gage stem or tube 8, of glass or other suitable transparent material, is closed at its outer end 9 and is open at its inner end 10, being preferably provided with a side portion 11 around this open end 10. A scale sheet 12 can be fitted in this transparent gage tube or stem 8, and can have shown thereon any desired indications or markings or indicia, as indicated at 13, to be visible through the transparent tube or stem 8.

The connecting sleeve 6 has an opening therethrough to receive the stem or tube 8, and of greater diameter than the portions of the tube 8 around the open end 10, and a packing sleeve 14, of soft rubber or of other suitable packing material, is fitted at the open end of the tube or stem 8 and when the tube is inserted in place within the opening of the connecting sleeve, this packing sleeve 14 engages with the wall of the opening. The connecting sleeve 6 has the outer end of the opening thereof restricted or tapered, as at 15, and the packing sleeve 14 is preferably correspondingly formed or shaped to be tapered.

The connecting sleeve 6 has an internally bored portion thereof provided with screw threads, as at 16, this threaded portion 16 being inwardly beyond the position normally occupied by the open end 10 of the tube or stem 8; and, a rimmed washer-like packing nut 17 has the rim thereof provided with mating screw threads so that this packing nut can be turned into the threaded portion 16 to compress the packing sleeve 14. This packing nut 17 may be provided with an opening 18 aligned with the central opening of the tube or stem 8, and may have slots or openings 19 in the rim thereof, or in some other suitable point, to receive a screw driver or spanner tool, or other means by which the packing nut is tightened into place.

At its lower end, the body or bulb portion 1 can carry the usual shot and wax, or other weighting medium, as at 20. With the parts constructed in the manner set forth, the gage tube or stem 8 can be readily and quickly made up in glass tubing without requiring the services of a glass blower or other worker or artisan particularly skilled in glass welding or working, and by closely gaging the weight and size of the glass tubing, these stems can be manufactured and produced in sizes and weights uniform and accurate to a high degree. After the stem or tube 8 is prepared, the packing sleeve 14 is readily fitted thereon and then the end 9 of the tube or stem 8 is inserted through the opening in the connecting sleeve 6 and the stem or tube is pushed through to extend from the outer end of the connecting sleeve, with the packing sleeve 14 received within the opening of the connecting sleeve and engaging with the tapered portion 15 of this opening. It will of course be understood that the packing sleeve 14 will probably project endwise into the internal bore of the connecting sleeve 6 having the screw threads 16, and when the packing nut 17 is fitted in place and is turned into the screw threads 16, this packing nut will force the packing sleeve 14 into intimate contact with the tapered portion 15 of the opening through the connecting sleeve, and will at the same time compress the material of the packing sleeve to conform and fit in liquid tight contact with the stem or tube 8 around the open end 10. If desired, an adhesive or sealing material can be applied between the tube 8 and the packing sleeve 14 and between the packing sleeve 14 and the connecting sleeve 6, and an adhesive or sealing material can be coated or applied at the threads 16 to secure the packing nut in its tightened position. Then, the connecting sleeve has its threaded portion 7 turned onto the threaded portion 5 of the body or bulb 1 around the open end 3, and if an adhesive or sealing material be applied at the screw threads, the parts are held against accidental or casual displacement or separating, and the open end 3 of the body or bulb portion 1 is sealed in liquid tight connection with the connecting sleeve 6. If desired, ribs or roughening portions 21 can be provided on the connecting sleeve 6 to permit a better grip for turning the same to thus facilitate assembly and tightening of the connecting sleeve upon the bulb or body portion 1.

With the parts constructed and associated and assembled in the manner set forth, the packing sleeve 14 is interposed between the stem or tube 8 and the material of the connecting sleeve 6, and as this packing sleeve 14 is of cushion or yielding material, the stem or tube 8 can be moved slightly angularly, and thus the degree of breakage at this point is materially lessened. As the stem 8 is ordinarily made of glass tubing, readily frangible, and the body portion 1 and connecting sleeve 6 are of molded and not readily frangible material, the sleeve 6 and body 1 will afford considerable protection against breakage of the stem 8, and the packing sleeve 14 will further cushion and will permit relative movement and bending to relieve strains that would ordinarily break a hydrometer float element of the usual type having a glass stem welded to a glass float body.

In the modified construction illustrated in Fig. 3, I have shown the body 22 as being of substantially cylindrical tubular form and open at both ends, this body portion 22 being preferably provided with external screws 23 at one end and internal screw threads 24 at the other end, for convenient manufacture and assembly. A bottom closure member 25 is provided with a screw threaded portion to be intermeshed with the threaded portion 24 of the body 22, and thus this bottom closure member is fitted and secured in place. As illustrated, this bottom portion has and presents a considerable mass of material and consequently is of greater weight than the corresponding middle portion of the body 22. This weight and mass and body can be gaged and calculated to serve as the weighting for the finished float element, or the recess 26 can have weighting material introduced thereinto. The parts 22, 27 and 29 can be made of hard rubber, a synthetic resin, or of any other suitable material.

An extension sleeve 27 is provided with a screw threaded portion to mate with the threaded portion 23 at the upper end of the body portion 22, and this extension sleeve has at its upper end a screw threaded portion 28 corresponding substantially to the threaded portion 5 as described in connection with the showing in Fig. 2, adapted to receive and secure a connecting sleeve 29 similar to connecting sleeve 6. A gage stem or tube 30, similar to tube or stem 8 is associated with the connecting sleeve 29, substantially in the manner set forth in connection with the disclosure in Fig. 2. With this adaptation and construction, the length and weight of the closure member 25 can be varied and figured and regulated to suit different liquid solutions and different conditions of use; and, likewise, the length of the extension sleeve 27 can be varied to make the entire assembled body portion of greater or less length.

From the foregoing it will be seen that I have provided a hydrometer float element having a body portion and connecting sleeve structure of moldable material that can be made up with great rapidity by the use of machines or other molding apparatus, to have the density and weight thereof controlled with close accuracy, and which parts are of simple and inexpensive construction both in manufacturing and assembly; that the stem portion can be made by simple glass working operations without the necessity of welding as is required for the usual association of a glass stem and glass body or float bulb; and, that the frangible glass stem and the not readily frangible body or bulb portion are assembled and associated and connected together in liquid tight form and with a cushion mounting between the two so that the two parts can bend or twist substantially at the waist or point of assembly, without danger of the frangible glass stem or tube being broken or damaged. In actual practice and in the manufacture of large numbers of my improved hydrometer float element, I have found that a higher degree of accuracy can be attained and maintained than has been heretofore commercially practicable, that the float element is proportionately less expensive and less complicated to manufacture than the ordinary glass float as heretofore used, and that the completed and assembled float element is a better and more accurate product and is destined to a longer life due to the fact that the possibility of breakage is materially lessened.

While I have herein shown and described only certain specific embodiments of my invention and have suggested only certain possible modifications, it will be appreciated that many changes and variations can be made in the form, construction, arrangement, assembly, association and securement of the parts, and in the placement and manner of display of the calibrations or indicating designations, and in the materials and manner of assembly and manner of use, without departing from the spirit and scope of my invention.

I claim:

1. A hydrometer float comprising, a float bulb portion of substantially rigid material having an open connecting sleeve at one end, a gauge stem of breakable material such as glass, an intermediate member of cushion material like rubber fitted between said connecting sleeve and stem, and means to compress the intermediate member within the connecting sleeve to establish a liquid-tight and yet cushioned connection around the stem.

2. A hydrometer float comprising, a substantially rigid float bulb portion having an open upper end, a glass gauge stem having an open lower end, a connecting sleeve mounted at the open ends of the bulb portion and the stem portion, a soft rubber packing member interposed between the two portions to establish a liquid-tight seal and allow yielding movement of the stem with respect to the float bulb portion, and means to hold the soft rubber member in packing engagement with the stem and sleeve.

3. A hydrometer float comprising, a glass float gauge stem open at its lower end and having an outstanding bead around said open end, a float bulb structure open at its upper end and of relatively greater diameter than the diameter of the gauge stem, a connecting sleeve at the upper end of the float bulb having an opening relatively larger than the beaded end of the gauge stem, said opening of the sleeve being internally screw threaded at its inner end, a soft rubber packing member having an opening therethrough provided with a groove fitted upon the end of the glass stem with the bead thereof received in the groove and fitted within the opening of the connecting sleeve, and a packing nut having an open center turned into the threaded end of the opening to confine the rubber packing member and establish a liquid-tight connection between the glass gauge stem and the connecting sleeve.

LEO EDELMANN.